United States Patent Office 2,897,140
Patented July 28, 1959

2,897,140

PROCESS FOR THE OXIDATION OF MERCAPTANS IN THE PRESENCE OF ALKALI AND SULFUR DYE

André Gislon, Paris, and Edouard Joseph Weisang, Le Havre, France, assignors to Compagnie Francaise de Raffinage, Paris, France, a societe anonyme of French Republic No Drawing. Application April 5, 1955
Serial No. 499,498

Claims priority, application France April 7, 1954

7 Claims. (Cl. 208—204)

The present invention is concerned with alkaline solutions containing mercaptides, and also with hydrocarbonic compounds and mixtures of hydrocarbons containing mercaptans. It consists of a treatment intended to convert these mercaptides and mercaptans to disulphides.

It is well known on the one hand, that while mercaptans or mercaptides can only be oxidized to disulphides with great difficulty by the direct action of oxygen or of air, it is possible, on the other hand, to carry out such oxidation in the presence of third compounds which act as oxidizing agents or catalysts, for example phenolic derivatives such as amino-phenol, quinhydrone and other similar products, or again certain organo-metallic compounds with chelated links or again certain mineral compounds such as cupric chloride, ferric sulphate, etc. It is also known that the mercaptans contained in petroleum products such as solvents, petrols and kerosenes can be extracted by means of alkaline solutions, these mercaptans then being in the form of alkaline mercaptides. The mercaptans being thus eliminated from the products of the petroleum type, the alkaline solutions are then regenerated by a treatment with steam or by oxidation in the presence of an oxidation-assisting agent, for example: phenolic derivatives such as hydroquinone, pyrogallol, etc., the carboxylic polyhydroxy-benzenic acids or tannins; such methods finally enable sweet petroleum products to be obtained together with a regenerated alkaline extraction solution.

It is well known, on the other hand, that dyes of the type known as "sulphur dyes" can be reduced by the sulphides of the alkaline metals, and that they subsequently re-oxidize, for example under the action of oxygen, of air or of any gas containing these. This property of the said "sulphur dyes" is frequently applied in different dyeing processes.

The present invention has for its object the regeneration of alkaline solutions containing alkaline mercaptides, such as those which have served in the extraction of the mercaptans present in hydrocarbonic compounds and products of the petroleum type. It consists in subjecting these solutions to the action of oxygen, of air or of any oxidizing gas in the presence of dyes of the type known as "sulphur dyes."

The present invention has also for its object the sweetening of hydrocarbonic compounds, of mixtures of the said compounds, and of fractions of distillation of products of the petroleum type, by the action of oxygen, of air or of any oxidizing gas in the presence of dyes of the type known as "sulphur dyes."

Further improvements and developments in accordance with the invention will be explained in the description which follows below.

The applicants have established that the dyes of the type known as "sulphur dyes," such as for example (the enumeration given not being restrictive), the compounds known commercially under the name of:

Hydrone blue or solane blue R (Color Index No. 971)
Sulphanol green 2J (Color Index No. 53570)
Dark green sulphanol B (Color Index No. 1002)
Brown sulphanol BR (Color Index No. 53210)
Blue sulphanol B (Color Index No. 956)
Laval cachou (Color Index No. 933)
Black sulphanol B (Color Index No. 978)

are reduced in an alkaline medium by the mercaptides, which are then oxidized to disulphides.

For example, a soda liquor containing tertiary-butyl mercaptide of sodium is brought into contact with hydrone blue; there is then observed a transformation of the color which becomes green, and this is an indication of the reduction of this dye; at the same time, the mercaptide is oxidized to disulphide. If the alkaline phase is then treated with a current of air, the dye resumes its initial blue color as a result of its re-oxidation.

In addition, the applicants have observed that these two operations could be carried out simultaneously, so that this method can be applied to the oxidation to disulphides of the mercaptides contained in alkaline liquors, this oxidation being then accompanied by the regeneration of these liquors by reason of their ability to absorb mercaptans in the form of alkaline mercaptides.

The examples which follow, and which do not constitute a limitation of the invention, illustrate the application of this method.

EXAMPLE 1

To 1,000 cc. of an aqueous alcoholic solution of soda of about 30% by weight, and about 30% of methanol containing 0.309 gram of sulphur in the form of n-butyl-mercaptide of sodium, there is added 0.2 gram of dark green sulphanol B commercial dye in suspension.

After stirring for 40 minutes in the presence of air, the alkaline solution no longer contains any mercaptide.

To the solution thus regenerated, there is again added 0.248 gram of sulphur in the form of n-butyl-mercaptide; after 40 minutes stirring in air, the alkaline solution no longer contains any mercaptide.

EXAMPLE 2

To 1,000 cc. of an aqueous solution of soda of about 18% by weight, containing 0.617 gram of sulphur in the form of n-butyl-mercaptide of sodium, there is added 0.2 gram of commercial dark green sulphanol B dye in suspension. After 40 minutes' stirring in the presence of air, the alkaline solution no longer contains any mercaptide.

To the solution thus regenerated, there is again added 0.496 gram of sulphur in the form of n-butyl-mercaptan; after 40 minutes' stirring in air, the alkaline solution no longer contains any mercaptide.

The same operation has been repeated several times, and after 10 grams of sulphur had been oxidized by 1 gram of dye, the oxidizing power of the said dye showed no sign of weakening and this further demonstrates the catalytic power of oxidation of the dye.

EXAMPLE 3

To 1,000 cc. of an aqueous solution of potash to about 45% by weight, and about 20% of tricresol containing 0.598 gram of sulphur in the form of mercaptide of potassium, there is added 0.1 gram of dark green dye sulphanol B, in suspension.

After 40 minutes' stirring in the presence of air, the alkaline solution no longer contains any mercaptide.

To the solution thus regenerated, there is again added 0.26 gram of sulphur in the form of mercaptan; after 40 minutes' stirring in air, the alkaline solution no longer contains any mercaptide.

It has been found possible to repeat this same operation a number of times without any weakening being observed of the oxidizing power of the dye, which had then oxidized 16 grams of sulphur for 1 gram of the said dye.

The applicants have established on the other hand, that if aliphatic, aromatic or naphthenic hydrocarbon compounds, alone or in mixtures, or products of the petroleum type, containing mercaptans are mixed with an alkaline lye containing a dye of the type of the "sulphur dyes" in suspension, and in the presence of oxygen, of air or of any oxidizing gas, the reaction of reduction of the dye, of oxidation of the mercaptans to disulphides, and the re-oxidation of the reduced form of the dye, together with the regeneration of the latter, are effected simultaneously.

In addition, the applicants have found that the presence of third constituents such as for example (and without this enumeration being construed in any limiting sense): methanol, ethanol, isopropyl alcohol, tricresol, isobutyl acid, etc., acting as solvents of the said mercaptans with respect to the alkaline aqueous phase containing the said dyes, greatly assist this reaction by increasing the speed of oxidation of the mercaptans contained in the said hydrocarbons.

The following examples, which are not to be construed as restrictive, specially illustrate the objects of the present invention in this latter case.

EXAMPLE 4

Seven samples of 1,000 cc. of heptane containing 0.036% by weight of sulphur in the form of n-butyl-mercaptan, are simultaneously stirred in the presence of air with 500 cc. of lyes of caustic soda at 15% by weight, containing respectively, in suspension, 1 gram of one of various "sulphur dyes" as follows:

1. Dark green sulphanol B;
2. Laval cachou;
3. Green sulphanol 2J;
4. Blue sulphanol B;
5. Black sulphanol B;
6. Brown sulphanol BR;
7. Blue sulphanol RB.

Table I given below shows the results of the treatment of mercaptans effected, as a function of the time, during the course of the reactions. This table clearly demonstrates the role of an oxidation catalyst for oxidizing the mercaptans to disulphides, which is played by the said dyes.

*Table I*

| No. of dye | S% (RSH)/time in minutes | | | | |
|---|---|---|---|---|---|
| | 0 minutes | 5 minutes | 10 minutes | 15 minutes | 20 minutes |
| 1 | 0.036 | Sweet | | | |
| 2 | 0.036 | Sweet | | | |
| 3 | 0.036 | 0.012 | Sweet | | |
| 4 | 0.036 | Sweet | | | |
| 5 | 0.036 | Sweet | | | |
| 6 | 0.036 | Sweet | | | |
| 7 | 0.036 | 0.020 | 0.009 | 0.003 | Sweet |

EXAMPLE 5

1,000 cc. of a petrol obtained by distillation ($d$, 15°= 0.717; initial and final boiling points 41°–143° C.), containing 0.018% by weight of sulphur in the form of mercaptan, are stirred in the presence of air with 300 cc. of caustic soda lye at 18% by weight, containing in suspension 0.3 gram of dark green dye sulphanol B. After stirring for one hour, this petrol was decanted and separated and no longer contained any mercaptan (sweet).

1,000 cc. of the same petrol of distillation is again treated with the same alkaline dye solution; after one hour's stirring, this second sample of petrol became sweet. This same operation was repeated 22 times without any weakening being noted of the power of catalytic oxidation of the said dye, which had then oxidized 10 grams of sulphur for 1 gram of dye.

EXAMPLE 6

Fourteen samples of 1,000 cc. of kerosene ($d$=0.808, initial and final boiling points: 198°–292° C.), containing 0.034% by weight of sulphur in the form of mercaptan, are treated simultaneously under the following conditions:

6–a. A first series of seven samples are stirred in the presence of air with 500 cc. of lyes of caustic potash, at 45% by weight, each respectively containing in suspension 1 gram of one of the seven "sulphur dyes" cited in Example 4, and numbered 1 to 7 for reference;

6–b. A second series of seven samples are stirred in the presence of air with 540 cc. of hydro-alcoholic solutions composed of 500 cc. of a lye of caustic potash at 45% by weight and 40 cc. of ethanol, these solutions each respectively containing in suspension 1 gram of one of the seven "sulphur dyes" previously referred to.

Table II, which is given below, shows the results of the treatment of mercaptans effected, as a function of the time, during the course of the sweetening reactions. This table clearly shows the part played by the third compounds, acting as solvents of the mercaptans in respect of the alkaline phase containing the dyes.

*Table II*

| No. of dye | Tests | Ethanol, cc. | S% (RSH)/time in minutes | | | | | |
|---|---|---|---|---|---|---|---|---|
| | | | 0 | 5 | 10 | 20 | 40 | 80 |
| 1 | a | | 0.036 | 0.010 | 0.006 | 0.003 | 0.0025 | 0.0020 |
| | b | 40 | 0.036 | Sweet | | | | |
| 2 | a | | 0.036 | 0.019 | 0.014 | 0.010 | 0.007 | 0.005 |
| | b | 40 | 0.036 | Sweet | | | | |
| 3 | a | | 0.036 | 0.026 | 0.025 | 0.023 | 0.021 | 0.019 |
| | b | 40 | 0.036 | 0.004 | 0.003 | 0.002 | 0.001 | Sweet |
| 4 | a | | 0.036 | 0.027 | 0.025 | 0.024 | 0.024 | 0.023 |
| | b | 40 | 0.036 | 0.014 | 0.013 | 0.012 | 0.011 | 0.009 |
| 5 | a | | 0.036 | 0.025 | 0.022 | 0.020 | 0.018 | 0.017 |
| | b | 40 | 0.036 | 0.008 | 0.005 | 0.003 | 0.0015 | Sweet |
| 6 | a | | 0.036 | 0.025 | 0.022 | 0.017 | 0.012 | 0.007 |
| | b | 40 | 0.036 | 0.001 | Sweet | | | |
| 7 | a | | 0.036 | 0.027 | 0.0265 | 0.025 | 0.025 | 0.023 |
| | b | 40 | 0.036 | 0.016 | 0.015 | 0.014 | 0.014 | 0.013 |

EXAMPLE 7

Five samples of 1,000 cc. of kerosene ($d$=0.796; initial and final boiling points: 180°–244° C.) containing 0.023% of sulphur in the form of mercaptan, are simultaneously stirred in the presence of air with 500 cc. of lyes of caustic soda at 30% by weight, all containing in suspension 1 gram of dark green sulphanol B dye, and respectively:

6–a. 0 cc. of ethanol
6–b. 10 cc. of ethanol
6–c. 20 cc. of ethanol
6–d. 40 cc. of ethanol
6–e. 60 cc. of ethanol Table III given below shows the results of the treatment of mercaptans effected, as a function of the time, during the course of the reactions, and also shows the influence of the various contents of ethanol during the sweetening treatment of products of the petroleum type, by the action of the oxygen in the air in the presence of "sulphur dye."

*Table III*

| No. of sample | Ethanol (cc.) | Time required to obtain sweetening (minutes) |
|---|---|---|
| 6–a | 0 | Greater than 80. |
| 6–b | 10 | 80. |
| 6–c | 20 | 40. |
| 6–d | 40 | 5. |
| 6–e | 60 | Less than 5. |

EXAMPLE 8

Four samples of 1,000 cc. of heptane, containing 0.025% of sulphur in the form of tertiary-amyl mercaptan are simultaneously stirred, in the presence of air, with 500 cc. of lyes of caustic potash at 30% by weight, each containing in suspension 1 gram of "sulphur dye" dark green sulphanol B, and respectively:

7–a. 0 cc. of tricresol
7–b. 0.5 cc. of tricresol
7–c. 2 cc. of tricresol
7–d. 5 cc. of tricresol The treatment of mercaptans effected, as a function of the time, during the course of the reactions, shows that the mercaptans contained in these four samples were completely oxidized to disulphides (sweet), in the times indicated in Table IV, given below.

*Table IV*

| No. of sample | Tricresol (cc.) | Time required to obtain sweetening (minutes) |
|---|---|---|
| 7–a | 0 | Greater than 20. |
| 7–b | 0.5 | 15. |
| 7–c | 2 | 5. |
| 7–d | 5 | Less than 5. |

This table once more demonstrates the favorable influence of third compounds, such as tricresol, in the sweetening reaction.

What we claim is:

1. A method of converting a sulphydryl contained in hydrocarbon compounds to disulphide, which comprises mixing the said hydrocarbon compounds with an aqueous alkaline solution of an alkali metal hydroxide, containing a dye of the "sulphur dyes" group, in the presence of an oxidizing gas.

2. A method of sweetening of petroleum products, which comprises mixing sour petroleum products with an aqueous alkaline solution of an alkali metal hydroxide, containing a dye of the "sulphur dyes" group, in the presence of an oxidizing gas.

3. A method of converting a sulphydryl contained in hydrocarbon compounds to disulphide, which comprises mixing the said hydrocarbon compounds with an aqueous alkaline solution of an alkali metal hydroxide, containing a dye of the "sulphur dyes" group, and an organic compound acting as a solvent of the said sulphydryl in respect of the said alkaline solution, in the presence of an oxidizing gas.

4. A method of sweetening of petroleum products, which comprises mixing sour petroleum products with an aqueous alkaline solution of an alkali metal hydroxide, containing a dye of the "sulphur dyes" group, and an organic compound acting as a solvent of mercaptans in respect of the said alkaline solution, in the presence of an oxidizing gas.

5. In the regeneration of aqueous alkaline solutions which have been used to extract mercaptans from hydrocarbon mixtures and contain the said mercaptans as mercaptides, the improvement which comprises mixing the said solution with an oxidizing gas in the presence of a dye of the "sulphur dyes" group.

6. A method of sweetening petroleum products which comprises mixing sour petroleum products with an aqueous alkaline solution of an alkali metal hydroxide containing a "sulphur dye" selected from the group consisting of hydrone blue, solane blue R, sulphanol green 2J, dark green sulphanol B, brown sulphanol BR, blue sulphanol B, Laval cachou, black sulphanol B and blue sulphanol RB.

7. In the regeneration of aqueous alkaline solutions which have been used to extract mercaptans from hydrocarbon mixtures and contain the said mercaptans as mercaptides, the improvement which comprises mixing the said solution with an oxidizing gas in the presence of a "sulphur dye" selected from the group consisting of hydrone blue, solane blue R, sulphanol green 2J, dark green sulphanol B, brown sulphanol BR, blue sulphanol B, Laval cachou, black sulphanol B and blue sulphanol RB.

References Cited in the file of this patent

UNITED STATES PATENTS

| 2,556,836 | Browder | June 12, 1951 |

OTHER REFERENCES

Georgievics et al.: A Textbook of Dye Chemistry, pages 483–500.